United States Patent [19]
Catone et al.

[11] Patent Number: 5,863,967
[45] Date of Patent: Jan. 26, 1999

[54] STABILIZED AND FLAME-RETARDANT PVC RESINS

[75] Inventors: David L. Catone, Hopkinton; Mark A. Kinsman, Upton, both of Mass.

[73] Assignee: Nyacol Products, Inc., Ashland, Mass.

[21] Appl. No.: 928,233

[22] Filed: Sep. 12, 1997

[51] Int. Cl.⁶ ........................................................ C08K 3/22

[52] U.S. Cl. ............................................ 523/200; 524/409

[58] Field of Search ............................... 523/200; 524/409

[56] References Cited

U.S. PATENT DOCUMENTS

| | | | |
|---|---|---|---|
| 4,059,540 | 11/1977 | Crompton | 252/309 |
| 4,731,198 | 3/1988 | Watanabe | 252/313.1 |
| 5,306,742 | 4/1994 | Kintz | 523/200 |

*Primary Examiner*—Paul R. Michl
*Attorney, Agent, or Firm*—Alvin Isaacs

[57] ABSTRACT

A halogen-containing vinyl resin such as polyvinyl chloride containing a thermal stabilizer and a flame retardant reagent comprising trivalent antimony deposited as a coating on the surface of a colloidal dispersion of antimony pentoxide particles.

9 Claims, No Drawings

STABILIZED AND FLAME-RETARDANT PVC RESINS

BACKGROUND OF THE INVENTION:

The present invention is directed to providing halogen-containing vinyl compounds such as polyvinyl chloride (PVC) resins which are characterized as being thermally stable and exhibiting flame retardancy. While the present invention is applicable to halogen-containing vinyl resins in general such as those heretofore well known in the art, for purposes of discussion only, the invention will be described with reference to PVC.

As is well known in the art, in only a few cases can PVC resins, as received from the manufacturer, be fabricated into products without the addition of a stabilizer. In this regard, PVC is unlike most thermoplastics. Milling or other processing of PVC at elevated temperatures rapidly results in unwanted discoloration. For example, when heated to ~200° C., a pronounced darkening will occur within thirty minutes. Other degradative effects at elevated temperatures include elimination of hydrogen chloride and irreversible adherence to equipment surfaces. For this reason, it is essential that a stabilizer be incorporated into the PVC resin before it is subjected to elevated temperatures either in fabrication or in its end use.

Stabilizers for PVC are per se well known in the art and accordingly need not be discussed in any great detail. Typical stabilizers for providing heat stability to PVC include Ba/Cd/Zn and phosphite type stabilizers. These and others are discussed in detail, in Handbook of Polyvinyl Chloride Formulating, edited by Edward J. Wickson, John Wiley & Sons (1993), Chapter 9, incorporated by reference herein.

Inherent problems arise when it is desired to include a flame retardant in the resin without adversely affecting both the stability of the resin and its optical qualities. These inherent difficulties may best be illustrated by reference to U.S. Pat. No. 4,608,198 issued to Watanabe et al. Aug. 8, 1986 and assigned to Nissan Chemical.

Watanabe is directed to flame retardants for halogen-containing vinyl compounds such as PVC in which the antimony pentoxide main component does not impair either the transparency or the thermal stability of the PVC. In Col. 1 it is explained that while PVC itself possesses excellent flame retardancy, flexible PVC elasticized with a plasticizer or blended with a combustible resin is easily burnt. Antimony trioxide flame retardants provide a great opacifying effect due to their large diameter (0.5 to 10.0 $\mu$m or so), their large refractive index and a small light transmittance. Therefore, the transparency which is the greatest feature of the halogen-containing vinyl resin will be completely lost if an antimony trioxide flame retardant is mixed with the resin.

In the paragraph bridging Cols. 1 and 2, it is explained that while antimony pentoxide is a flame retardant which does not cause the transparency of the resin to be lost, it worsens the stability of the resin. In the paragraph bridging Cols. 2 and 3, the cause of this worsening is explained. As stated therein, if antimony pentoxide is directly applied to provide flame retardancy, it will react with the metallic soap stabilizer which is usually used therein, e.g. zinc stearate, barium stearate or magnesium stearate which Watanabe states:

"... which will outstandingly deteriorate its function as a stabilizer. Consequently, the plasticized halogen-containing vinyl resin will be worsened in thermal stability, and it can be presumed that the coloring and the bloom/bleed phenomena will be caused."

According to the invention described and claimed in Watanabe, these problems are solved by providing an antimony pentoxide powder having a particle size of 0.2 to 10 $\mu$m (microns), which powder further contains specified amounts of (A) alkali metal oxide; (B) alkaline earth metal oxide; and (C) phosphoric acid, an ammonium salt of phosphoric acid, or an alkali metal salt of phosphoric acid.

It is stated in the patent that the flame retardant of the invention does not impair the transparency, the thermal stability, or the bleeding resistance of the halogen-containing vinyl resins which, as described in the patent, includig the illustrative examples, further contain the known heat stabilizers.

U.S. Pat. No. 3,897,389 issued to Touval Jul. 29, 1975 and assigned to M&T Chemicals, Inc., while apparently directed to reducing the antimony content while enhancing flame retarding efficiency alludes (Col. 1) to the fact that antimony trioxide "may be inappropriate in some applications where it is desired to have the final product in transparent form." In Col. 4 relating to test results, reference is made to a PVC specimen including, among other reagents, a heat stabilizer containing Ba/Cd/Zn and phosphorous, as well known, and stearic acid. According to the invention, flame retardancy may be provided to this resin as well as the others recited in the specification by incorporating therein a flame-retardant amount of sodium antimonate, the particles of which exhibit an average size of about 1.5 $\mu$m, the size of the individual particles being between about 0.1 and 8 $\mu$m.

Finally, reference is made to U.S. Pat. No. 4,741,865 issued to Kintz et al. May 3, 1988 and assigned to Nyacol Products, Inc., assignee of the present application.

In the paragraph bridging Cols. 2 and 3, it is stated that for many flame retardant applications, antimony pentoxide sols are dried to powders prior to use. It has been found that some polymer systems containing colloidal antimony pentoxide powder are degraded when cured by heating or otherwise exposed to elevated temperatures. Such degradation is evidenced by discoloration. It is then stated that this heat degradation can be alleviated by changing the surface of the antimony pentoxide particles to replace the hydronium ions on the surface with certain metal ions prior to spray drying. The required metals have essentially insoluble antimonates. Sodium, barium and calcium antimonates are insoluble, and solutions containing these metal ions are suitable for treating before drying. A convenient way to judge if an effective amount of metal substitution has been obtained is by the pH. A final pH of about 6.5 to 11 prior to drying indicates sufficient metal substitution. It is further stated that if the powder is to be used in a PVC plastisol, sufficient metal hydroxide (NaOH preferred) to provide a pH of 7.5 to 10 should be added to the antimony pentoxide sol before drying, with pH values of 8 to 9 being preferred. [The patent claims all define the invention in terms of the pH, the convenient way to define the effective amount of metal substitution.]

In the examples, the antimony pentoxide flame retardant is added to a plastisol of PVC (dispersion of PVC in plasticizers) including barium, cadmium, zinc and phosphite heat stabilizers.

An embodiment of the invention described and claimed in the Kintz et al. patent described as a zero tint antimony pentoxide flame retardant powder is commercially available from PQ Corporation under the trade designation NYACOL ZTA. PQ's product sheet for NYACOL ZTA states that NYACOL ZTA has been specifically developed for flame retarding polyvinyl chloride. It has improved heat stability when used with Ba/Cd/Zn and phosphite type stabilizers.

In summary, all three of the above-mentioned patents and the commercial embodiment of the Kintz et al. patent have the common denominator in that their respective antimony pentoxide flame retardant compositions, when used with halogen containing vinyl resins having incorporated therein a heat stabilizer, provide the desired flame retardancy without degradation or adversely affecting the heat stability and optical qualities, e.g., the clarity or transparency of the resin.

Notwithstanding the fact that the aforementioned patented systems are said by the respective patentees to be capable of commercial acceptance and that the Kintz et al system assigned to the assignee of this application is in fact personally known to applicant to have achieved commercial success, there is always a continuing need for improvement of any product towards optimizing the product's acceptance, whether this be in performance or lowering manufacturing costs.

For this reason, Applicant engaged in a research effort at the R&D facility of Nyacol Products, Inc. with the view to improve the addition of a flame retardant to halogen-containing vinyl resins without any degradative effects.

BRIEF DESCRIPTION OF THE INVENTION

In the course of this research effort, it was discovered unexpectedly that the antimony oxide flame retardants comprising trivalent antimony deposited on the surface of a colloidal dispersion of antimony pentoxide particles which are described and claimed in U.S. Pat. No. 5,306,742 issued to Kintz and assigned to Nyacol products, Inc. provide the requisite flame retardancy without any of the deleterious effects on the function of the stabilizers for heat stability included in the PVC resin or the resin's optical qualities.

DETAILED DESCRIPTION OF THE INVENTION

As heretofore mentioned, the present invention is directed to the task of providing flame retardancy and thermal stability to halogen-containing vinyl resins, of which PVC is the best example.

By way of recapitulation, while antimony trioxide is an excellent flame retardant, when mixed with halogen-containing vinyl resins, the transparency which is the greatest feature of the resin is completely lost. On the other hand, when antimony pentoxide is mixed with the resin to provide flame retardancy, while the transparency is maintained, the thermal stability of the resin is worsened due to reaction with the heat stabilizers incorporated in the resin.

Consequently, there was a great need in the art to find a flame retardant for halogen-containing resins which will provide the needed flame retardancy without adverse effects such as those discussed in the BACKGROUND OF THE INVENTION.

The Watanabe et al. patent is said to solve this task with the claimed flame retardant additive having three reagents in addition to antimony pentoxide; Touval is said to solve the problem by employing the claimed sodium antimonate flame retardant additive; while the Kintz et al invention the problem is stated to be alleviated by changing the surface of the antimony pentoxide particles to replace the hydronium ions on the surface with insoluble metal ions.

The essence of the present invention is the flame retardant dispersions described and claimed in the aforementioned U.S. Pat. No. 5,306,742 primarily for use in polyester and vinyl ester resins to provide flame retardancy properties to fiberglass or other articles containing these resins without altering their cure characteristics or otherwise adversely affecting the final product are unexpectedly useful also in PVC resins including thermal stabilizers.

As discussed in the Kintz '742 patent, in a typical process for preparing fiberglass laminates, a coating comprising at least a liquid polyester vehicle, a crosslinking initiator, a metallic crosslinking promoter and a thickening agent is allowed to cure at room temperature until it reaches a partial cure known as the "gel state". At this point an impregnating composition including a flame retardant is applied over the gel coat. After additional steps described in the patent but which need not be discussed here, there is a holding period until the cure is complete.

According to the patent, with certain resins in the impregnating solution, the addition of antimony pentoxide flame retardants such as the NYACOL APE1540 flame retardant dispersion tends to adversely affect the cure to a varying extent, depending upon the resin employed. This adverse effect can range from little or no consequence to significant deficiencies in the fiberglass composite. According to Applicant's belief, these adverse effects on the cure rate are believed to be due, at least in part, to the antimony pentoxide deactivating the metallic promoter for curing.

For this reason, the stated task of the invention in the Kintz '742 patent was to supply antimony pentoxide flame retardant in usable form for incorporation in unsaturated polyesters for preparing fiberglass composite products without altering or impairing the cure characteristics of the polyester to form the desired fiberglass product.

Commercial use of that invention has heretofore been so restricted until the present invention in which Applicant has discovered that it may also be used to solve the task of the present invention for use in providing flame retardancy to halogen-containing vinyl compounds, notably PVC.

The antimony oxide flame retardant dispersions contemplated by the present invention containing trivalent antimony deposited on the surface of antimony pentoxide particles may be prepared in a manner similar to that described in the Kintz '742 patent by heating a mixture of antimony pentoxide water sol and antimony trioxide while maintaining the water content of the mixture at a temperature and for a time (e.g. 85°–95° C. for at least 4 hours) to cause an interaction of the oxides wherein trivalent antimony is deposited on the surface of the antimony pentoxide.

In the preferred embodiment of this invention, this product having trivalent antimony deposited on the surface of a colloidal dispersion of antimony pentoxide particles is then dried, e.g. by spraydrying, in an oven by or any other desired means to a dry powder.

Alternatively, in a less desired embodiment, it is contemplated that the flame retardant comprising trivalent antimony deposited on the surface of a colloidal dispersion of antimony pentoxide particles may be employed in a liquid polymeric vehicle. Suitable liquid polymeric vehicles will be readily suggested to those skilled in the art and need not be discussed further.

As is recited in the '742 patent, to prepare the antimony oxide flame retardants of the present invention, the ratio by weight of antimony trioxide to antimony pentoxide may be on the order of from about 2:10 to about 4:10, with a particularly useful ratio being on the order of about 3.5:10. The colloidal antimony pentoxide particles to be coated with the antimony trioxide may range in size from about 0.015 $\mu$m to about 0.065 $\mu$m.

The amount of the antimony oxide powder flame retardant will in part be dependent upon the formulation of the resin in which it is to be incorporated and will in part be dependent upon the degree or extent of flame retardancy desired. Accordingly, the amount to be employed will be most accurately defined as an "effective amount" for obtaining the desired flame retardancy. By way of illustration, an amount on the order of from about 1.5 to about 3.5 percent by weight antimony oxide (expressed as 100% antimony pentoxide) has been found to be effective to provide commercially acceptable flame retardancy.

The following Example shows by way of illustration and not by way of limitation the preparation of the preferred flame retardant powder to be incorporated in the PVC resin according to the present invention.

EXAMPLE 1

Using the proportions of reagents recited in Example 1 of the '742 patent, 275.4 gms. of antimony trioxide are added to 8000 ml. of 9.04 % antimony pentoxide aqueous sol containing 786.84 gms of $Sb_2O_5$. The resulting mixture is then heated to 85°–95° C. for in excess of 24 hours while maintaining the water content of the mixture to cause an interaction of the oxides so that the trivalent antimony is deposited as a coating on the surface of the pentoxide. The particles having trivalent antimony deposited on the surface of a colloidal dispersion of antimony pentoxide are then spraydried to a powder.

EXAMPLE 2

The PVC plastisol compositions 2a, b, c, d, and e recited in the following table were prepared:

TABLE

| Item | 2a gms | 2b gms | 2c gms | 2d gms | 2e gms |
| --- | --- | --- | --- | --- | --- |
| PVC plastisol grade resin ("Geon" 121, B. F. Goodrich) | 100 | 100 | 100 | 100 | 100 |
| Phthalate plasticizer ("Santicizer" 711, Monsanto) | 50 | 50 | 50 | 50 | 50 |
| $Sb_2O_5$ powder of Ex. 1 | 2.5 | 2.5 | | | |
| Commercial Sb2O5 powder (NYACOL A1588LP) | | | | 2.5 | |
| Epoxidized soybean oil stabilizer ("Plas-Chek" 775, Ferro) | 5 | | | 5 | 5 |
| Ba/Zn salt stabilizers ("THERM-CHEK" 1159-SF, Ferro) | 3 | | | 3 | 3 |

In the above Table, Sample 2a illustrates the present invention, while Samples 2b, 2c, 2d and 2e constitute controls against which Sample 2a is compared for thermal stability in the following Example.

EXAMPLE 3

Thermal stability was tested by subjecting strips of the 2a, b, c, d & e samples to a temperature of 177° C. for periods of 10, 20, 30, 40, 50, 60, 70 and 80 minutes. In lieu of quantitative data on the extent of any color change, reliance was instead had upon visual observation of the test samples, which observation was entirely sufficient for purposes of comparison to determine the efficacy of the present invention. (Visual observation is of a magnitude more meaningful to the end user than is numerical data.) Changes in color, generally referred to in the art as a "yellowing" of the resin, will range from amber→brown→black.

Looking first at Sample 2e, it was observed, not surprisingly, that this sample containing only the thermal stabilizers exhibited excellent stability, being visually clear after 80 minutes.

Referring next to Sample 2a, the sample illustrating the present invention containing both the stabilizers (as in Sample 2a) and the antimony oxide flame retardant of this invention (comprising antimony pentoxide particles coated with trivalent antimony), it was found that Sample 2a was substantially as clear as Sample 2e, indicating no adverse effect on thermal stability by incorporating the flame retardant.

On the other hand, Sample 2d, illustrating a sample containing thermal stabilizer and a commercially available antimony pentoxide flame retardant of the prior art, exhibited a yellowing after about 30 minutes which became progressively darker at each successive 10 minute intervals. [Applicant believes that the commercially available unmodified antimony pentoxide flame retardant powders of the prior art will as a class exhibit at least as much darkening as the illustrative NYACOL A1588LP recited in Example 2.]

As expected, Sample 2c, the sample with no stabilizer, commenced darkening after about 30 minutes and progressing at each ten minute interval, becoming quite dark after about 70 minutes.

Finally, Sample 2b, the sample with the flame retardant of this invention but no stabilizer exhibited a pattern of darkening strikingly similar to that of Sample 2c, indicating that the presence of the flame retardant in 2b had no effect on the thermal stability, i.e.,, was no better or no worse than that of 2c having no flame retardant.

From the foregoing test data, it will be observed that with the flame retardant of this invention, wherein the antimony pentoxide which adversely reacts with the thermal stabilizer is coated with trivalent antimony, there is no visually detectable change in thermal stability. From this observation, it can be concluded that the trivalent antimony coating functions as a "protective" layer precluding interaction between the pentoxide particles and the stabilizers so as to negate the effect of the thermal stabilizers.

To summarize, the use of the antimony oxide powder of this invention to provide flame retardancy to the halogen-containing vinyl resin does not adversely affect the presence of the stabilizers necessary for providing thermal stability to the resin.

This is in contradistinction to the adverse effects on thermal stability of these resins when antimony pentoxide flame retardants in general are contained in the resin, as was discussed earlier in the BACKGROUND OF THE INVENTION.

In the foregoing description, great emphasis has been placed for purposes of illustration upon the specific halogen-containing vinyl resin, polyvinyl chloride, the species of greatest commercial interest. However, as has been stated, the invention is not so limited, but instead is directed to halogen-containing vinyl resins in general, i.e., both halogen-containing vinyl homopolymers and copolymers, whether or not they include a plasticizer.

Since certain changes may be made without departing from the scope of the invention herein contemplated, it is to be expressly understood that the foregoing description, including the specific examples, is by way of illustration and not by way of limitation.

What is claimed is:

1. In a halogen-containing vinyl resin composition including a thermal stabilizing reagent and a flame retardant reagent;
    the improvement wherein the flame retardant reagent is an effective amount of an antimony oxide powder comprising trivalent antimony coated on the surface of a colloidal dispersion of antimony pentoxide particles.

2. A resin composition as defined in claim 1 wherein the resin composition is a plasitsol.

3. A resin composition as defined in claim 1 wherein the resin is a vinyl homopolymer.

4. A resin composition as defined in claim 1 wherein the antimony oxide powder is prepared from an interaction between antimony trioxide and colloidal antimony pentoxide particles and the ratio by weight of antimony trioxide to antimony pentoxide is from about 2:10 to about 4:10.

5. A resin composition as defined in claim 4 wherein the antimony pentoxide particles range in size from about 0.015 to about 0.065 microns before creating with antimony trioxide.

6. A polyvinyl chloride resin composition including at least one stabilizer for providing thermal stability to the resin and an effective amount of an antimony oxide flame retardant comprising trivalent antimony deposited on the surface of a colloidal dispersion of antimony pentoxide particles.

7. A resin composition as defined in claim 6 wherein the polyvinyl chloride resin is a plastisol.

8. A resin composition as defined in claim 6 wherein the antimony oxide powder is prepared from an interaction between antimony trioxide and colloidal antimony pentoxide particles and the ratio by weight of antimony trioxide to antimony pentoxide is from about 2:10 to about 4:10.

9. A resin composition as defined in claim 8 wherein the antimony pentoxide particles range in size from about 0.015 to about 0.065 microns before coating with antimony trioxide.

* * * * *